Feb. 4, 1958
J. W. DIXON
2,822,034
COLLAPSIBLE LATERAL BACK SUPPORT FOR HUMANS ON VEHICLE SEATS
Filed Nov. 22, 1955
2 Sheets-Sheet 1
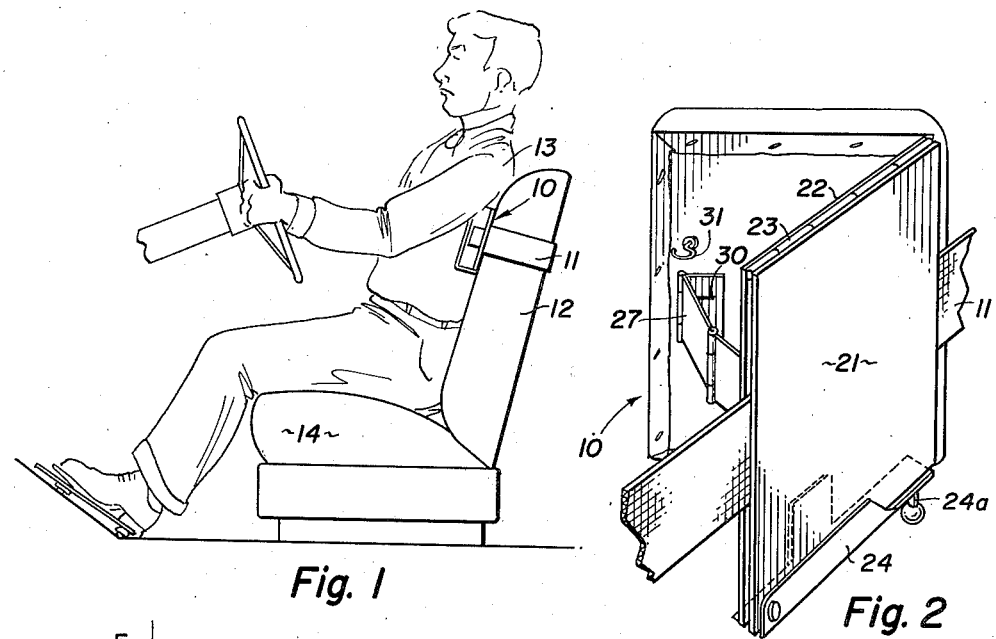
Fig. 1
Fig. 2
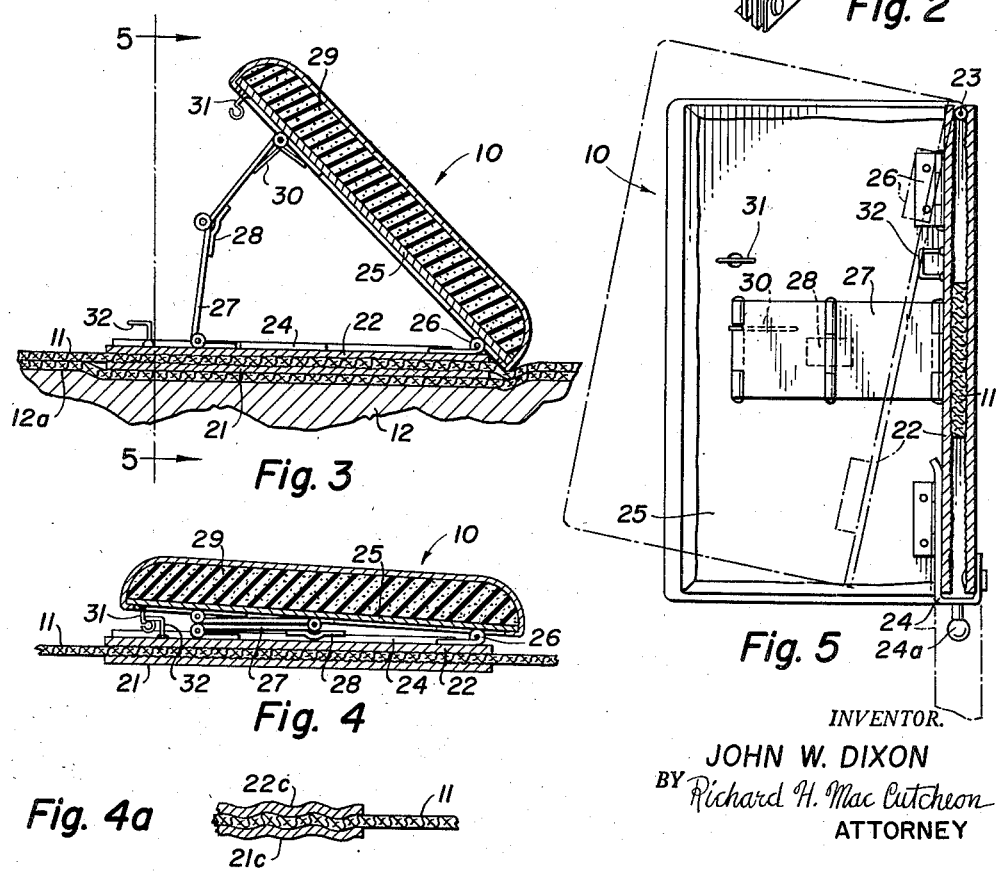
Fig. 3
Fig. 4
Fig. 4a
Fig. 5
INVENTOR.
JOHN W. DIXON
BY Richard H. MacCutcheon
ATTORNEY INVENTOR.
JOHN W. DIXON
BY Richard H. MacCutcheon
ATTORNEY

United States Patent Office 2,822,034
Patented Feb. 4, 1958

2,822,034

COLLAPSIBLE LATERAL BACK SUPPORT FOR HUMANS ON VEHICLE SEATS

John W. Dixon, Shaker Heights, Ohio

Application November 22, 1955, Serial No. 548,322

3 Claims. (Cl. 155—182)

This invention relates to back rest supports for use in automobiles or the like.

In my co-pending patent application, Ser. No. 535,121, filed September 19, 1955, there is described and claimed lateral support comprising for a seat back, laterally extending strap means, and a pair of resilient pads having provision for laterally adjustable connection to the strap means, all to the end of providing simple and inexpensive and readily removable and adjustable means furnishing adequate lateral support for the back and shoulders of a vehicle driver or passenger. One difficulty in connection with apparatus built strictly in accordance with the disclosure of said patent application has been found in that when the supports are in place they interfere with driver's or passanger's ingress and egress to and from the vehicle.

It is an object of the present invention to provide simple means for overcoming the above mentioned difficulty.

Another object is to provide easily adjustable and collapsible lateral support means for a human torso with respect to vehicle seat back.

Broadly, the means employed in an embodiment herein illustrated and described comprises a pair of pads each having means for its lateral adjustment with respect to a seat back and each having substantially vertically extending hinge means for collapsing the pad against the back when the pad is not in use. Thus the pad may readily be collapsed as the driver or passenger gets out of the car and then re-expanded to its working position when driver or passenger is again in position within the vehicle.

Other objects and advantages will become apparent and the invention will be better understood from consideration of the following description taken in connection with the accompanying drawings in which:

Fig. 1 is a side elevational view showing a human body as seated on a vehicle seat having a seat back provided with collapsible lateral support means in accordance with the invention;

Fig. 2 is a perspective view of a portion of the apparatus of Fig. 1 and with the support pad shown in 45° open position as in Fig. 1;

Fig. 3 is a cross-sectional view of the apparatus as in Fig. 2 showing the support pad in 45° open position and also showing a portion of the vehicle seat back;

Fig. 4 is a view similar to Fig. 3 and showing the apparatus in closed or collapsed position;

Fig. 4a is a fragmentary cross section through the back plate, strap and intermediate plate wherein said back plate and intermediate plate are corrugated.

Fig. 5 is a side view taken on the line 5—5 of Fig. 4 and showing the apparatus in 45° open position but also showing in dashed lines the separation of strap engaging back and intermediate plates by tilting the intermediate plate forwardly from the bottom;

Figure 6:
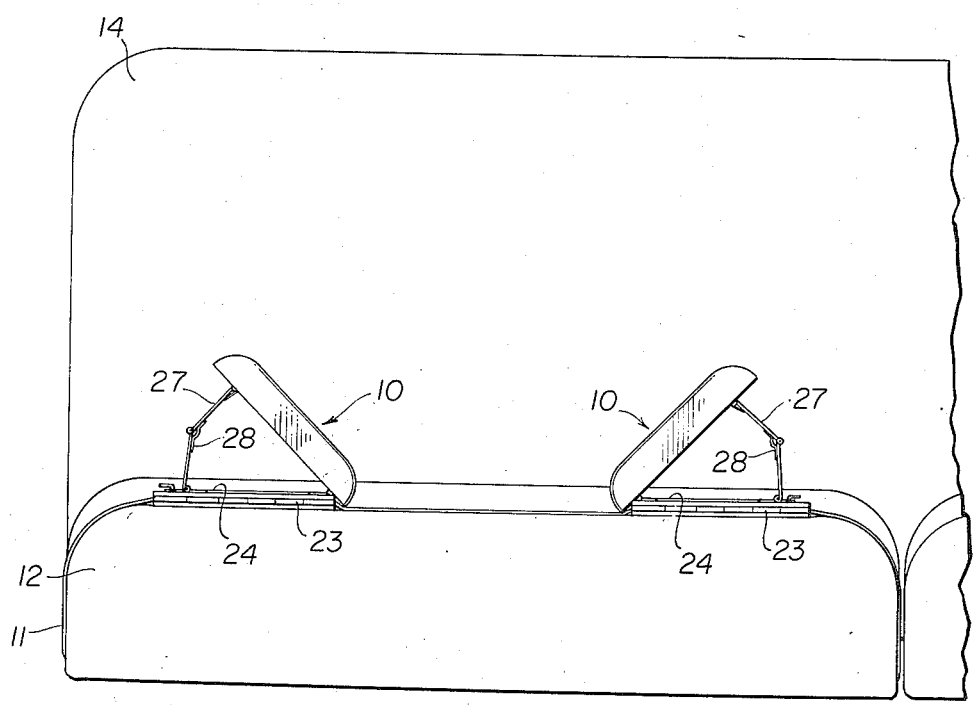
Fig. 6 is a plan view of a seat back and associated parts according to the invention.

In accordance with the invention, I provide for each (or any) vehicle occupant a pair of lateral support resilient pads such as the one shown at 10 in Fig. 1. As in the prior application, for each such pad, means may be provided for selectively removing it from or securing it to a strap or web 11 completely encircling or otherwise associated with a conventional seat back 12. Alternatively, each pad may be adjustable directly with respect to the seat back front facing or upholstery without the use of an encircling strap. As a human being 13 sits upon an associated seat bottom 14, he is supported against side sway by pad 10 (and its mate) preferably at the side portions of his back just below the level of the armpits.

As seen in Figs. 3–5 the pad apparatus is clamped with respect to the seat back 12 (covered with upholstery 12a) for example through the intermediate encircling strap 11 and this apparatus comprises a back or grip plate 21 engaging the strap means at the seat back side, an intermediate or hinge plate 22 hinged at its top (through hinge 23) with the back plate 21 and engaging the strap means on the opposite or front side. A bottom latch 24 is hinged at one end to one of the plates and manually operable from the opposite end (as by pulling on a downwardly extending knob 24a) to selectively unclamp or clamp the plates together upon the strap means at a predetermined lateral location to suit the comfort of a human body. A third or "pad" plate 25 is hinged at one side to the intermediate plate 22 as by a substantially vertically extending hinge 26. A two part middle hinged bracket member 27 with a hinge stop 28 extends at the opposite side from intermediate plate to third plate and serves as a positive stop to hold the third plate 25 and an attached resilient support pad 29 in expanded position until the hinge stop is tripped, as by the flick of a finger. If desired, operation of the hinge stop may be expedited by the inclusion of a long arm coil spring 30 in a manner so well known as to not require further explanation. Thus the apparatus may readily be expanded to form a substantial angle with the seat back, for example at 45° as shown, and securely held at such an angle until it is desired that it be released whereupon the hinge stop is folded inward (see Fig. 4) to collapsed position. If desired, spring retaining means may also be employed to hold the parts in collapsed position and such means may take the form of a spring latch 31 associated with one part of the apparatus and a hook 32 associated with another part.

Preferably the "front" surface of the back plate is roughened as shown in Figs. 3 and 4 and the back side of the intermediate plate 22 is roughened so that these members will firmly grip the strap means, or alternatively these members may be corrugated as shown at 21c and 22c in Fig. 4a.

It will be apparent that the bottom latch 24 may be dropped to the dotted position shown in Fig. 5 after which the hinge plate 22 and the associated third plate 25 and resilient pad 29 may have their bottoms raised through a small angle sufficient to enable complete removal of all the apparatus from the strap means as for storage in a glove compartment until a long trip is contemplated.

While I have illustrated a particular embodiment, various modifications may obviously be made without departing from the true spirit and scope of the invention which I intend to define in the appended claims.

I claim:

1. For use in connection with a seat back of an automobile, truck, bus, or the like, the combination of a pair of pads each independently of the other laterally adjustable with respect to the seat back so that the pair with the seat back may partially encompass the sides and back of a human body regardless of size thereof, and substantially vertically extending hinge means associated with each pad whereby the same may be selectively opened to so encompass or collapsed against the seat back to provide ready ingress to or egress from the space between the pair of pads.

2. Lateral support for humans on flat vehicle seats and comprising a pair of separately laterally adjustable pads each having means for its lateral adjustment with respect to a seat back and each having substantially vertically extending hinge means for collapsing the pad against the seat back when the pad is not in use.

3. For providing adjustable and collapsible lateral support means for a human body with respect to a seat back in a vehicle, the combination of a seat and seat back, laterally extending strap means associated with said seat back, a pair of pads each comprising a back plate for engaging the strap means at its seat back side, an intermediate plate hinged at its top to the back plate and for engaging the strap means on the opposite or front side, means for selectively clamping said plates together and upon the strap means at a predetermined lateral location to suit the comfort of a human body, a third plate hinged at its side to the intermediate plate for selectively collapsing associate apparatus against the seat back or expanding the portion of the apparatus associated with the third plate to form a substantial angle with the seat back, manually releasable means for holding the third plate in expanded position, and a resilient pad secured to the third plate for supporting a portion of the body of a driver or passenger when in position upon the seat in the vehicle.

References Cited in the file of this patent

UNITED STATES PATENTS

| | | |
|---|---|---|
| 1,509,318 | Rumsey | Sept. 23, 1924 |
| 1,673,433 | Wheeler et al. | June 12, 1928 |
| 2,738,249 | Tenenblatt | Mar. 13, 1956 |

FOREIGN PATENTS

| | | |
|---|---|---|
| 448,367 | Great Britain | June 8, 1936 |